June 15, 1954  S. KUDELSKI  2,681,432
DEVICE FOR PRODUCING HIGH-TENSION
CURRENTS OF LOW CURRENT INTENSITY
Filed Nov. 15, 1949
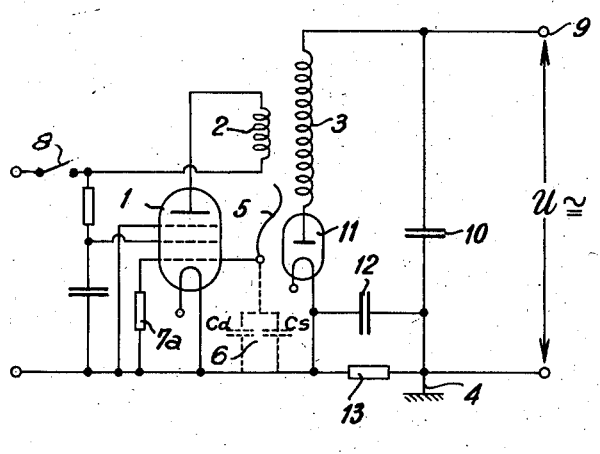
INVENTOR
STEFAN KUDELSKI
By:
Hazeltine, Lake & Co.
AGENTS Patented June 15, 1954

2,681,432

UNITED STATES PATENT OFFICE 2,681,432

DEVICE FOR PRODUCING HIGH-TENSION CURRENTS OF LOW CURRENT INTENSITY

Stefan Kudelski, Geneva, Switzerland, assignor to Hydro-Nitro S. A., Geneva, Switzerland, a corporation of Switzerland Application November 15, 1949, Serial No. 127,391

3 Claims. (Cl. 321—2)

My invention relates to an extremely simple device for producing a high tension for low current consumption and, especially, a high tension output, usable for supplying ionizing devices, small neon tubes, cathode ray devices for television purposes, and the like.

For producing such high tensions, there is well known to use a high frequency valve oscillator, coupled to the output circuit by a tension highly increasing transformer. But, the output tension of such devices is very unstable. Furthermore, a known system, as referred to, comprises at least three coils, highly insulated one from another, including an anode coil, a high frequency oscillator circuit coil, and a coupling-back coil of the oscillator valve.

Now, I have discovered, that by using the self-induction and the distributed capacity of the numerous windings of the secondary of a high frequency transformer of great tension transforming rate, as the determinating members of the generator circuit of a valve oscillator, and by using a capacitive coupling back to the grid of said oscillator valve, very high tensions are attained by extremely simple and inexpensive means, for such a circuit only comprises a valve, a high frequency two-coil-transformer, a gridleak resistance and a minute high tension resisting coupling-back capacity. Furthermore I have discovered, that under special, practically and theoretically exactly defined circumstances, this circuit results in producing stabilized oscillations, the conditions of maintenance of these oscillations being substantially independent of variations of the load. This state of special adaption is attained by avoiding any members of perceivable capacity connected to the grid, by these means holding the static capacity of said grid to at most a third of its dynamic capacity, and by adjusting the aforementioned capacitive tension divider, consisting of the effective grid capacity (sum of static and dynamic grid capacity) and the capacitive coupling member in such a manner, that the capacity of the latter only amounts to a low fraction of the effective grid capacity of the valve. For, under these circumstances, the effective capacity of the grid decisively is determined by its dynamic capacity and, as well known this dynamic capacity being a function of the anode potential drop, any variation in the anode load therefore will produce an increase of the grid controlling amplitude, which, by use of properly dimensioned grid biasing means, may result in an increase of output energy, maintaining the necessary conditions for producing oscillations.

My invention will best be understood by the following description of the annexed drawing which shows a practical circuit arrangement according to my invention—

Fig. 1 shows a practical circuit arrangement of this kind, completed by rectifier means for a high tension direct current output.

The oscillator valve 1 is connected in series to the primary 2 of a high frequency transformer, the secondary 3 of which having at least the twofold of windings than said primary. Therefore, said secondary 3, comprising for instance 600 windings, has a relatively high value of distributed capacity and is adapted to oscillate in the manner of a Tesla-coil, grounded at one end at 4. The other end of said secondary coil, having in a state of oscillating a very considerable high frequency tension against earth, is used for coupling-back to the control grid of the valve 1. This coupling-back is achieved, according to the invention, by a capacitive tension divider consisting of a capacitive coupling member 5 and the effective capacity 6 of the control grid itself, only. This effective capacity 6 represents the sum of the static capacity $C_s$ and the dynamic capacity $C_d$. If the static capacity of the grid is held low by a suitable construction of the valve, and by avoiding any members of perceptible capacity against earth, connected to the grid a ratio $C_d:C_s=3:1$ or more may be attainable. Therefore, the grid-leak resistance 7 must be one of the lowest capacity type.

Now, if the switch 8 is closed after heating the cathode of the valve 1, oscillations are set up within the Tesla-coil 3, delivering a very high oscillating tension to the output end 9 in respect of ground 4. By the described coupling-back means these oscillations are sustained in an undamped state, the grid receiving by electron catch a negative biased potential, determined by the resistance 7. Within the capacitive tension divider 5, 6, ninety percent or more of the Tesla tension must be allotted to the capacitive member 5 in order to attain an adapted grid amplitude. Therefore, this member must have a corresponding small capacity in respect of the effective and dynamic capacity 6 of the grid. In practice, the static grid capacity $C_s$ of normal receiving tubes will amount to 10–20 pF, the capacity of the member 5 therefore being made lower than 1 pF, preferably ca. 0.1–0.2 pF.

A high tension capacity of this extremely low value is very inexpensive and, for instance, may be produced by a short metal strip, or wire, connected to the grid of the tube 1 and near to the high potential end of the Tesla-coil 3. Also, a simple two-coil high tension Tesla transformer (2, 3) will be very inexpensive and the whole connection does not comprise more than the valve 1 and the gridleak resistance 7 in addition to this transformer.

But, the device involves a surprising fact: If the output 9 is loaded, this load is transmitted to the anode circuit of the valve 1 and will decrease the dynamic capacity $C_d$ of the grid. In consequence, the tension dividing ratio of the capacitive tension divider 5, 6 is varied and the control amplitude, delivered from that divider to the grid of the valve 1, is increased. The conditions for sustaining oscillations are thus maintained, substantially independently of the external load.

In order to attain a direct current output, the grounded end of the Tesla coil 3 is grounded—in respect of its alternating current potential—by means of the condenser 10, furthermore using as a direct current storage condenser and having a capacity of about 30–3000 pF. The coil 3 is connected in series to a rectifier valve 11, the cathode of which is grounded. The capacitive coupling wire 5 is neared to the anode of said rectifier valve.

In order to cut the output from the mains, a high resistance 13 may be used, shunted by a condenser 12, the latter short-circuiting the high frequency potential drop of said resistance. The valve 1 as shown is a normal pentode but could also be a triode or another electronic valve; the control grid of which is connected to the member 5, while the other grids are biased in the usual manner. For ionizing or neon tubes energizing purposes, the input may be derived directly from the mains, while for cathode ray tube supplying or the like, I prefer to derive the input from batteries or a high-grade commercial rectifier set. By use of a normal input tension of 220 volts and a commercial receiver pentode I have attained an output direct current tension of 6000–15000 volts, without any second transformer or other additional means, as mentioned.

What I claim is:

1. An electric oscillator for producing high tension currents of low current intensity comprising, in combination; an electronic valve having a cathode, control grid and anode, a single tuned circuit inductively coupled to said anode of said valve, a capacitive voltage divider consisting of a coupling condenser and the interelectrode capacity between grid and cathode of said valve, the capacity of said coupling condenser being substantially smaller than said interelectrode capacity, a uni-directional current conducting device connected across said voltage divider, one side of said tuned circuit being connected to said control grid through said coupling condenser, and a storage condenser, the other side of said tuned circuit being connected to ground through said storage condenser and the cathode of said valve also being connected to ground whereby oscillations of said tuned circuit may be sustained over a wide range of values of a load connected across said storage condenser.

2. The electric oscillator as claimed in claim 1 wherein the uni-directional current conducting device is a diode tube.

3. An electric oscillator for producing high tension currents of low current intensity comprising, in combination; an electronic valve having a cathode, control grid and anode, a single tuned circuit inductively coupled to said anode of said valve, said tuned circuit comprising a secondary coil having a high impedance and also having stray capacity, a capacitive voltage divider consisting of a coupling condenser and the interelectrode capacity between grid and cathode of said valve, the capacity of said coupling condenser being substantially smaller than said interelectrode capacity and the stray capacity of the coil in said tuned circuit also being substantially smaller than said interelectrode capacity, a uni-directional current conducting device connected across said voltage divider, one side of said tuned circuit being connected to said control grid through said coupling condenser, and a storage condenser, the other side of said tuned circuit being connected to ground through said storage condenser and the cathode of said valve also being connected to ground whereby oscillations of said tuned circuit may be sustained over a wide range of values of a load connected across said storage condenser.

References Cited in the file of this patent

UNITED STATES PATENTS

| Number | Name | Date |
|---|---|---|
| 2,018,370 | Lunnon | Oct. 22, 1935 |
| 2,205,233 | Van Slooten | June 18, 1940 |
| 2,292,798 | Van Roberts | Aug. 11, 1942 |
| 2,306,888 | Knick | Dec. 29, 1942 |
| 2,532,834 | Christenson | Dec. 5, 1950 |

FOREIGN PATENTS

| Number | Country | Date |
|---|---|---|
| 353,627 | Great Britain | July 30, 1931 |